(No Model.)

M. J. WIGHTMAN & H. LEMP.
METHOD OF REGULATING DYNAMO ELECTRIC MACHINES.

No. 501,309. Patented July 11, 1893.

ATTEST:
T. F. Conrey.
Wm. N. Capel.

INVENTORS:
M. J. Wightman &
H. Lemp
By H. C. Townsend
Attorney.

UNITED STATES PATENT OFFICE.

MERLE J. WIGHTMAN AND HERMANN LEMP, OF HARTFORD, CONNECTICUT, ASSIGNORS TO THE SCHUYLER ELECTRIC COMPANY, OF CONNECTICUT.

METHOD OF REGULATING DYNAMO-ELECTRIC MACHINES.

SPECIFICATION forming part of Letters Patent No. 501,309, dated July 11, 1893.

Application filed February 13, 1886. Serial No. 191,815. (No model.)

*To all whom it may concern:*

Be it known that we, MERLE J. WIGHTMAN and HERMANN LEMP, citizens of the United States, and residents of Hartford, in the county of Hartford and State of Connecticut, have invented a certain new and useful Regulator for Dynamo-Electric Machines and Motors, of which the following is a specification.

Our invention consists in regulating or governing the action of a dynamo electric generator or motor through variations of the current in an exciting coil or portion of coil for the same, effected by adjusting or determining the relative potential at the terminals of a branch circuit of practically constant resistance around the circuit or portion of exciting circuit containing said exciting coil or portion of coil.

Figure 1:
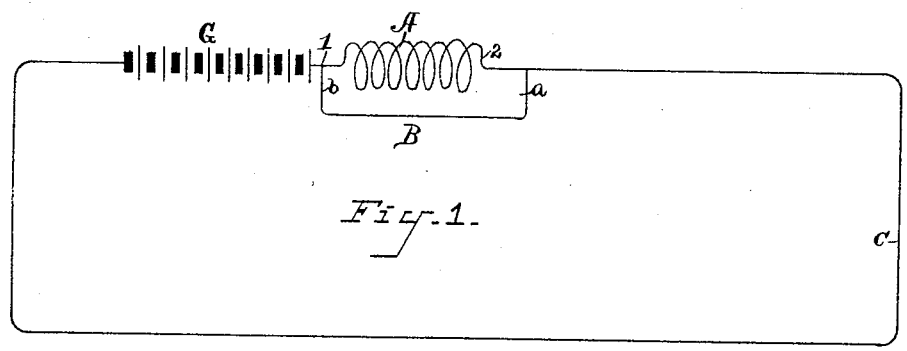
Figure 2:
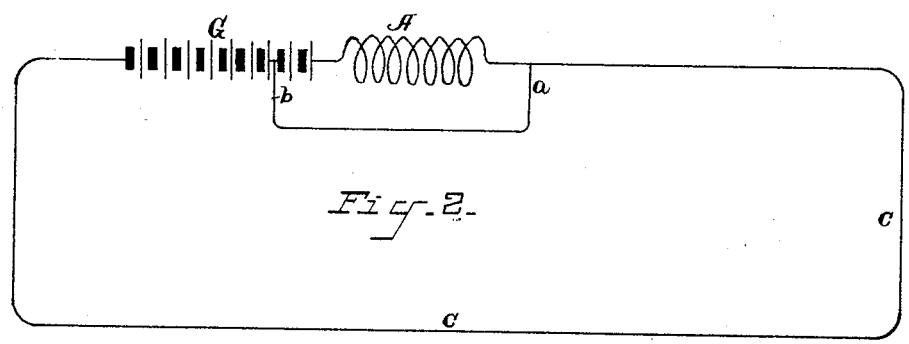
Figure 3:
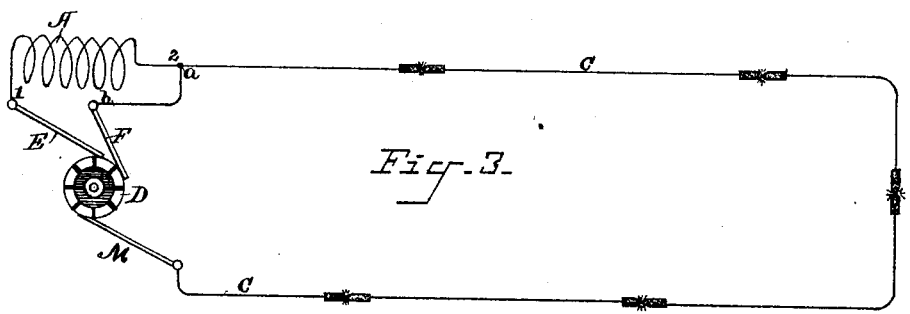
Figure 4:
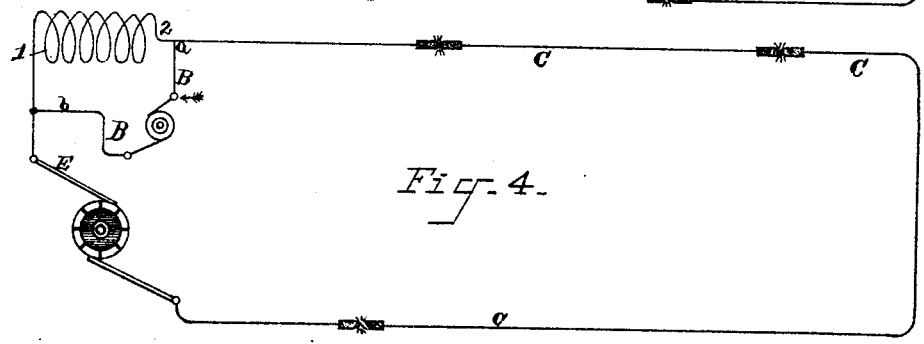

In the accompanying drawings: Figures 1 and 2, are diagrams illustrating the principle of our invention. Figs. 3 and 4, illustrate diagrammatically, arrangements of circuits and devices whereby our method of regulation may be utilized on a dynamo electric machine.

In Figs. 1 and 2, we have represented at G, a generator in the form of a galvanic battery. Said battery is to be taken as typical of any generator of electricity, to which an electric connection may be made at any point according to the potential desired at the point of connection. At A, is represented a coil of wire which may be considered as an exciting coil or portion of exciting coil by which a magnetic field for a dynamo is produced. Said coil is connected into a circuit C, with the generator G, which may be regarded as the armature or portion of the machine in which the electric current is generated. B, is a branch wire or conductor connected at its terminals $a$, $b$, with the circuit in which coil A, is placed, at opposite sides of said coil. Owing to the resistance of the coil A, the potential at the end 2, of the coil will be less than the potential at the end 1, nearest the generator. The potential at the terminal $a$, of the branch will therefore be less than that at the terminal $b$, and there will therefore be a flow of current from $b$ to $a$, through the branch, which will be dependent in amount upon the relative resistance of said branch and the coil. If the branch be a low resistance branch nearly all the current will flow through the same around the coil, and the excitation produced by the latter if it be a field coil of a dynamo or motor will of course be very small. If now by any means the potential at the terminals of the branch where it is connected with the circuit can be made the same, it is obvious that there will be no flow of current from G, through the branch and no diversion of current from the coil A, because of the well known law that current will not flow from a point of given potential to another point of the same potential. By varying or changing the relative potential at the terminals of the branch, we change or vary the flow through said branch or connection and hence vary the amount of current diverted from A, and as a consequence the exciting action of the latter upon the armature of the machine.

The potential of the terminals $b$ and $a$, of the branch may obviously be made the same (if the branch be practically of no resistance) by lowering the potential at $b$, by as much as the potential at the point 2, of the circuit at which $a$, is connected, is less than the potential at the point 1, of the circuit where $b$, is connected, which result would obviously be produced by connecting the terminal $b$, to the generator at a point where the potential would be less as indicated in Fig. 2. For example, if the potential at the terminal 1, of the battery be represented by 10, and the potential at 2, be 8, giving a difference of potential of 2, the potentials at $a$ and $b$, may be made the same by connecting $b$, to the generator at a point where its potential will be 8, and will therefore be the same as that of the point where $a$, is connected. Under these conditions to wit: equality of potential, no current will flow from $a$ to $b$, through the branch, the coil A, would be producing its maximum exciting effect and the machine would, other conditions remaining the same, be producing its maximum current. By moving the connection $b$, along the generator to a point where its potential will be greater a difference of potential between $b$ and $a$, will arise, and current will then begin to be diverted from the coil A, the amount of diversion being increased according to the increase in the difference of potential between $b$ and $a$, produced by connecting $b$, to points of higher and higher potential.

As the principle of our invention depends upon the fact that a flow from $b$ to $a$, is dependent upon the existence of a higher potential in $b$, than in $a$, and upon the further well known law that if the potential be equal at the ends $b$, $a$, no flow will take place, it is obvious that theoretically considered the equality or difference of potential might be produced by raising the potential at $a$, to get equality of potential and consequent absence of flow through the branch or by decreasing the potential at such point to secure a flow of any desired amount, and a consequent cutting down of the influences of coil A.

The gist of our invention consists in determining or adjusting the relative potential of the terminals $b$ and $a$, by whatever means effected, a difference of potential of greater or less amount according to the effect upon coil A, desired, being made to exist when it is desired to vary the action of said coil and an equality of potential being brought about when it is desired that said coil should act with its maximum effect. One of the ways of securing such equality of potential that may be employed consists in setting up in the branch between points $a$ and $b$, a counter electro motive force or tendency counter to that accompanying the tendency to flow from the generator from $b$ to $a$, arising from their normal difference of potential.

This particular way of practicing the broad invention herein claimed is made the subject of another application for patent filed by us.

By varying such counter electro motive tendency a difference of potential at points $b$ and $a$, may be caused to exist such difference being greater as the counter electro motive tendency falls and the diversion of current from the coil A, being correspondingly great.

Having described the general principles of our invention, we will describe some of the devices that may be employed in practicing the same.

Fig. 3, shows the application of the invention to a dynamo electric machine. A, indicates the field magnet of the machine; D, the commutator cylinder, and E, the brush or collector from which current is taken through the coil A, to the external circuit and back to the opposite collecting brush of the commutator in the usual way. F, is an auxiliary brush which is applied to the commutator and may be adjusted to points of different potential on the commutator. The branch B, is connected with said auxiliary brush. If the latter be adjusted to coincidence with the main collector E, so as to have the same potential it is obvious that very little current will flow through the coil A, owing to diversion of current through the branch. The branch may obviously be a short circuit or may contain resistance, its effect being however in the latter instance diminished. If the brush F, be adjusted to a point on the commutator where its potential is less than that of E, the difference of potential between the terminals $b$ and $a$, will be lessened to a degree dependent upon the lessening of potential of the brush, and less current will flow from $b$ to $a$. The decrease of potential at the brush and terminal $b$, may obviously be so far lessened in this way that $b$ and $a$, shall be practically of the same potential when practically no current will be diverted from the coil A, and the machine will work with its maximum efficiency for the given set of collecting brushes E and F, and the other given conditions of external circuit, &c. By adjusting the brush F, over the commutator the action of the coil A, may be governed or adjusted in manner obvious from the explanation already given. If the brush E, be not at the point of maximum potential on the commutator the adjustment for increasing the action of the field coil A, the brushes E and F, being supposed to be primarily at points of the same potential as the commutator might obviously be effected by moving the brush E, away from F, to a point of higher potential producing in substance the same action that is produced by moving F, away from E, to a point of lower potential, as will be clear from a consideration of the explanation given in connection with Figs. 1 and 2. It is therefore plain that the adjustment may be effected by moving one or the other of the two brushes E, F, so as to change the relative potential of the two brushes.

Adjustment may be effected by any of the automatic appliances employed in the art, or by hand, or in any other desired way.

We have obtained good results by the application of our method in the manner just described to machines of the kind patented to D. A. Schuyler under date of July 18, 1882, No. 261,390, and to Schuyler and Waterhouse, under date of January 15, 1884, No. 291,944.

As before explained the condition of potential in the branch B, at its terminals may be regulated or determined by other appliances as for instance by devices adapted to set up in the branch a counter electro motive tendency counter to that of the current tending to pass from $b$ to $a$, by reason of the difference of potential at the points where the terminals of the branch are connected to the circuit of A. A device for setting up such counter electro motive tendency and in variable degree may be an electric motor, a generator such as a dynamo machine or a portion of the generating parts of said machine.

M, Fig. 4, indicates the commutator collector of such a device. If the latter be a motor the counter electro motive force may be adjusted in the well known way by governing the speed at which the motor shall run. If the commutator M, be considered as that for armature coils of a dynamo, the counter electro motive force may be adjusted in any of the well known ways of adjusting the electro motive force of the current delivered from the armature to the circuit connected to the commutator. Such counter electro motive tendency may be sufficient to perfectly neutralize the electro motive tendency due to the difference of potential at the terminals of the branch and arising from the generator whose current flows in the exciting coils A, in which case there is produced a potential at the terminal $b$, the same as that at the terminal $a$, and there is no flow from the brush E, through the branch and around the coils A. If the counter electro motive force developed from the device M, be diminished the potential at $b$, as developed by the generator to which E, is connected will rise and a difference of potential will then exist between $b$ and $a$, which will be the greater the less the counter electro motive or potential tendency developed at $b$, by the device M, so that current will be diverted from A, to an amount corresponding to the lessening of the counter electro motive tendency of M. By this means the action of the coil A, can be adjusted so as to vary or determine the action or operation of the machine.

What we claim as our invention is—

1. The herein described method of regulating the action of a dynamo electric machine or motor consisting in determining by any desired means the relative potentials at the terminals of a branch connected to the circuit containing a field magnet coil or portion of coil at opposite sides of said coils respectively, irrespective of the resistance of said branch, as and for the purpose described.

2. The herein described method of regulating the action of a dynamo electric machine or motor consisting essentially in varying the relative potentials at the terminals, of a branch around a field magnet coil or portion of coil irrespective of the resistance of said branch.

Signed at Hartford, in the county of Hartford and State of Connecticut, this 4th day of February, A. D. 1886.

MERLE J. WIGHTMAN.
    HERMANN LEMP.

Witnesses:
  C. C. STIRLING,
  OSCAR URBAN.